US008941028B2

(12) United States Patent
Burberry et al.

(10) Patent No.: US 8,941,028 B2
(45) Date of Patent: Jan. 27, 2015

(54) SYSTEM FOR DIRECT ENGRAVING OF FLEXOGRAPHIC PRINTING MEMBERS

(75) Inventors: Mitchell S. Burberry, Webster, NY (US); Lee W. Tutt, Webster, NY (US); Lawrence A. Rowley, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 142 days.

(21) Appl. No.: 13/448,433

(22) Filed: Apr. 17, 2012

(65) Prior Publication Data

US 2013/0270236 A1 Oct. 17, 2013

(51) Int. Cl.
*B23K 26/00* (2014.01)
*B28B 17/00* (2006.01)
*B41N 1/00* (2006.01)
*B41C 3/08* (2006.01)

(52) U.S. Cl.
USPC .................. 219/121.68; 425/174.4; 101/395; 101/401.1

(58) Field of Classification Search
CPC .............. B41C 1/05; Y10S 430/145–430/146; Y10S 430/116; Y10S 430/114; B41N 1/12; G03F 7/027; G03F 7/029
USPC .......................... 219/121.68, 121.69, 121.72, 219/121.6–121.86; 264/440, 482; 101/395, 101/401.1, 471, 467; 430/327, 330, 942, 430/945, 944, 271.1, 273.1, 906, 908; 428/307, 483; 425/174.4
See application file for complete search history.

(56) References Cited

U.S. PATENT DOCUMENTS

| | | | | | |
|---|---|---|---|---|---|
| 4,060,032 | A | * | 11/1977 | Evans | 101/401.1 |
| 4,323,637 | A | * | 4/1982 | Chen et al. | 430/271.1 |
| 4,912,083 | A | | 3/1990 | Chapman et al. | |
| 4,942,141 | A | | 7/1990 | DeBoer et al. | |
| 4,948,776 | A | | 8/1990 | Evans et al. | |
| 4,948,777 | A | | 8/1990 | Evans et al. | |
| 4,948,778 | A | | 8/1990 | DeBoer et al. | |
| 4,950,639 | A | | 8/1990 | DeBoer et al. | |
| 4,950,640 | A | | 8/1990 | Evans et al. | |
| 4,952,552 | A | | 8/1990 | Chapman et al. | |
| 4,973,572 | A | | 11/1990 | DeBoer et al. | |
| 5,036,040 | A | | 7/1991 | Chapman et al. | |
| 5,156,938 | A | | 10/1992 | Foley et al. | |
| 5,166,024 | A | | 11/1992 | Bugner et al. | |
| 5,705,310 | A | * | 1/1998 | Van Zoeren | 430/201 |
| 5,719,009 | A | * | 2/1998 | Fan | 430/306 |
| 5,798,202 | A | | 8/1998 | Cushner et al. | |

(Continued)

FOREIGN PATENT DOCUMENTS

| | | | |
|---|---|---|---|
| EP | 1 894 957 A1 | | 3/2008 |
| JP | 2000-168253 | * | 6/2000 |
| WO | 2005/084959 | | 9/2005 |

OTHER PUBLICATIONS

Direct laser plate making, Consideration for current status; Association of Japanese Flexo printing industry, Feb. 1, 2010.

*Primary Examiner* — Dana Ross
*Assistant Examiner* — Gyounghyun Bae
(74) *Attorney, Agent, or Firm* — Nelson Adrian Blish

(57) ABSTRACT

A system for engraving a flexographic relief member includes a laser scanning apparatus providing a focused radiation beam. The flexographic relief member includes a laser engraveable flexographic member; a thin engraveable control layer on top of the flexographic member; and wherein the engraveable control layer has an engraving sensitivity lower than the flexographic member.

7 Claims, 3 Drawing Sheets

(56) References Cited

U.S. PATENT DOCUMENTS 5,804,353 A * 9/1998 Cushner et al. ............... 430/306
5,888,697 A * 3/1999 Fan ............................ 430/273.1
5,892,588 A 4/1999 Samworth
5,998,088 A 12/1999 Robello et al.
6,090,529 A * 7/2000 Gelbart ......................... 430/306
6,146,792 A * 11/2000 Blanchet-Fincher et al. ..... 430/7
6,159,659 A * 12/2000 Gelbart ......................... 430/306
6,367,381 B1 * 4/2002 Kanga ........................... 101/395
6,445,465 B1 * 9/2002 Samworth ...................... 358/1.9
6,627,385 B2 * 9/2003 Hiller et al. ................... 430/306
6,737,216 B2 * 5/2004 Kannurpatti et al. ...... 430/270.1
6,777,163 B2 * 8/2004 Fan et al. ................... 430/273.1
6,806,018 B2 * 10/2004 Kanga et al. .................. 430/138
6,880,461 B2 * 4/2005 Hiller ......................... 101/463.1
6,935,236 B2 * 8/2005 Hiller et al. ................ 101/401.1
6,960,423 B2 * 11/2005 Goodin ......................... 430/307
6,989,220 B2 * 1/2006 Kanga ............................ 430/14
7,197,980 B2 * 4/2007 Suzuki ............................ 101/32
7,284,484 B2 * 10/2007 Van Denend ................. 101/467
7,419,766 B2 * 9/2008 Kimelblat et al. ............ 430/302
7,486,420 B2 2/2009 McCrea et al.
7,754,415 B2 * 7/2010 Yamada et al. ............... 430/300
7,757,538 B2 * 7/2010 Mitterhofer et al. ............ 72/469
2003/0124466 A1 * 7/2003 Goodin ......................... 430/320
2003/0180636 A1 * 9/2003 Kanga et al. ..................... 430/18
2004/0067438 A1 * 4/2004 Fan et al. ................... 430/273.1
2004/0231540 A1 * 11/2004 Hiller ......................... 101/401.1
2008/0268371 A1 * 10/2008 Taguchi ..................... 430/270.1
2009/0223397 A1 9/2009 Miyagawa et al.
2009/0246469 A1 * 10/2009 Kawashima et al. ......... 428/156
2010/0015416 A1 * 1/2010 Kawashima et al. ...... 428/195.1
2010/0075117 A1 * 3/2010 Kawashima et al. ...... 428/195.1
2011/0089609 A1 4/2011 Landry-Coltrain et al.
2011/0189612 A1 * 8/2011 Goldstein ..................... 430/306
2011/0236705 A1 9/2011 Melamed et al.
2011/0252990 A1 * 10/2011 Shimazaki et al. ........ 101/401.1
2012/0048133 A1 3/2012 Burberry et al.
2012/0048135 A1 * 3/2012 Burberry et al. .............. 101/483

* cited by examiner

SYSTEM FOR DIRECT ENGRAVING OF FLEXOGRAPHIC PRINTING MEMBERS

CROSS REFERENCE TO RELATED APPLICATIONS

Reference is made to commonly-assigned copending U.S. patent application Ser. No. 13/448,435, filed Apr. 17, 2012, entitled METHOD FOR DIRECT ENGRAVING OF FLEXOGRAPHIC PRINTING MEMBERS, by Burberry et al.; the disclosure of which is incorporated herein.

FIELD OF THE INVENTION

This invention relates to the field of flexographic printing. More particularly, this invention relates to an improved system for preparing flexographic printing members using direct engraving methods. The flexographic printing members exhibit improved dot gain control and uniformity.

BACKGROUND OF THE INVENTION

Flexography is a method of printing that is commonly used for high-volume relief printing runs on a variety of substrates such as paper, paper stock board, corrugated board, polymeric films, labels, foils, fabrics, and laminates. Flexographic printing has found particular application in packaging, where it has displaced rotogravure and offset lithography printing techniques in many cases.

Flexographic printing members are sometimes known as "relief printing members" and are provided with raised relief images onto which ink is applied for application to a receiver element of some type. The raised relief images are inked in contrast to the relief "floor" that remains free of ink. Such flexographic printing members (such as flexographic printing plates) are supplied to the user as an article having one or more layers optionally on a substrate or backing material. Flexographic printing can be carried out using flexographic printing plates as well as flexographic printing cylinders or seamless sleeves having a desired relief image.

Generally, flexographic printing members are produced from a photosensitive resin or elastomeric rubber. A photomask, bearing an image pattern can be placed over the photosensitive resin sheet and the resulting masked resin is exposed to light, typically UV radiation, to crosslink the exposed portions of the resin, followed by developing treatment in which the unexposed portions (non-crosslinked) of the resin are washed away with a developing liquid. Recent developments have introduced the CTP (computer-to-plate) method of creating the mask for the photosensitive resin. In this method, a thin (generally 1-5 μm in thickness) light absorbing black layer is formed on the surface of the photosensitive resin plate and the resulting printing plate precursor is irradiated imagewise with an infrared laser to ablate portions of the mask on the resin plate directly without separately preparing the mask. In such systems, only the mask is ablated without ablating the photosensitive plate precursor. Subsequently, the photosensitive plate precursor is imagewise exposed to UV light through the ablated areas of the mask, to crosslink (or harden) the exposed portions of the photosensitive resin, followed by developing treatment in which the unexposed portions (uncrosslinked) of the resin and the remaining black mask layer are washed away with a developing liquid. Both these methods involve a developing treatment that requires the use of large quantities of liquids and solvents that subsequently need to be disposed of. In addition, the efficiency in producing flexographic printing plates is limited by the additional drying time of the developed plates that is required to remove the developing liquid and dry the plate. Often additional steps of post-UV exposure or other treatments are needed to harden the surface of the imaged printing plate.

While the quality of articles printed using flexographic printing members has improved significantly as the technology has matured, physical limitations related to the process of creating a relief image in a printing member still remain.

In the flexographic printing process, a flexographic printing member having a three-dimensional relief image formed in the printing surface is pressed against an inking unit (normally an Anilox roller) in order to provide ink on the topmost surface of the relief image. The inked raised areas are subsequently pressed against a suitable substrate that is mounted on an impression cylinder. As the flexographic printing member and Anilox or substrate are adjusted or limited mechanically, the height of the topmost surface determines the amount of physical impression pressure between the flexographic printing member and the Anilox or the flexographic printing member and the substrate. Areas in the relief image that are raised higher than others will produce more impression than those that are lower or even recessed. Therefore, the flexographic printing process is highly sensitive to the impression pressure that may affect the resulting image. Thus, the impression pressure must be carefully controlled. If the impression pressure is too high, some image areas can be squeezed and distorted, and if it is too low, ink transfer is insufficient. To provide the desired images, a pressman may test impression pressure settings for a given flexographic printing plate.

In particular, it is very difficult to print graphic images with fine dots, lines, and even text using flexographic printing members. In the lightest areas of the image (commonly referred to as "highlights"), the density of the image is represented by the total area of printed dots in a halftone screen representation of a continuous tone image. For Amplitude Modulated (AM) screening, this involves shrinking a plurality of halftone dots located on a fixed periodic grid to a very small size, the density of the highlight being represented by the area of the halftone dots. For Frequency Modulated (FM) screening, the size of the halftone dots is generally maintained at some fixed value, and the number of randomly or pseudo-randomly placed halftone dots represent the density of the image. In both of these situations, it is necessary to print very small dot sizes to adequately represent the highlight areas.

Maintaining small halftone dots on a flexographic printing member is very difficult due to the nature of the plate making process and the small size and lack of stability in the halftone dots. Digital flexographic printing precursors usually have an integral UV-opaque mask layer coated over a photopolymer or photosensitive layer in the relief image. In a pre-imaging (or post-imaging) step, the floor of the relief image in the printing member is set by area exposure to UV light from the back of the printing precursor. This exposure hardens the photopolymer to the relief depth required for optimal printing. This step is followed by selective ablation of the mask layer with an imagewise addressable laser to form an image mask that is opaque to ultraviolet (UV) light in non-ablated areas. Flood exposure to image-forming UV radiation and chemical processing are then carried out so that the areas not exposed to UV are removed in a processing apparatus using developing solvents, or by a heating and wicking process. The combination of the mask and UV exposure produces relief halftone dots that have a generally conical shape. The smallest of these halftone dots are prone to being removed during processing, which means no ink is transferred to these areas during printing (the halftone dot is not "held" or formed on the printing plate or on the printing press). Alternatively, if the small halftone dots survive processing, they are susceptible to damage on press. For example, small halftone dots often fold over or partially break off during printing, causing either excess ink or no ink to be transferred.

Conventional preparation of non-digital flexographic printing plates follows a similar process except that the integral mask is replaced by a separate film mask or "photo-tool" that is imaged separately and placed in contact with the flexographic printing precursor under a vacuum frame for the image-forming UV exposure.

A solution to overcome the highlight problem noted above is to establish a minimum halftone dot size during printing. This minimum halftone dot size must be large enough to survive processing, and be able to withstand printing pressure. Once this ideal halftone dot size is determined, a "bump" curve can be created that increases the size of the lower halftone dot values to the minimum halftone dot setting. However, this results in a loss of the dynamic range and detail in the highlight and shadow areas. Overall, there is less tonality and detail in the image.

Thus, it is well known that there is a limit to the minimum size of halftone dots that can be reliably represented on a flexographic printing member and subsequently printed onto a receiver element. The actual minimum size will vary with a variety of factors including flexographic printing member type, ink used for printing, and imaging device characteristics among other factors including the particular printing press that is used. This creates a problem in the highlight areas when using conventional AM screening since once the minimum halftone dot size is reached, further size reductions will generally have unpredictable results. If, for example, the minimum size halftone dot that can be printed is a 50×50 μm square dot, corresponding to a 5% tone at 114 lines per inch screen frequency, then it becomes very difficult to faithfully reproduce tones between 0% and 5%. A common design around this problem is to increase the highlight values in the original file to ensure that after imaging and processing, all the tonal values in the file are reproduced as printing dots and are properly formed on the printing member. However, a disadvantage of this practice is the resulting additional dot gain in the highlights that causes a noticeable transition between inked and non-inked areas.

Another known practical way of improving highlights is through the use of "Respi" or "double dot" screening as discussed in U.S. Pat. No. 7,486,420 (McCrea et al.). The problem with this type of screening technique, when applied to flexographic printing, is that the size of halftone dot that may be printed in isolation is actually quite large, typically 40-50 μm in diameter. Even when using this technique, the highlights are difficult to reproduce without having a grainy appearance, which occurs when halftone dots are spaced far apart to represent a very low density, and the printed halftone dot may also suffer an undesirable dot gain.

U.S. Pat. No. 7,486,420 discloses a flexographic screening technique that compensates for characteristic printing problems in highlight areas by selectively placing non-printing dots or pixels proximate to highlight dots. The non-printing dots or pixels raise the printing relief floor in the highlight areas providing additional support for marginally printable image features. This technique allows an image feature to be surrounded by one or more smaller non-printing features to provide an extra base of support for the image feature. While this provides an important advance in the art, it may not always completely eliminate the grainy appearance in the image.

MAXTONE screening (Eastman Kodak Company) is a known hybrid AM screening solution that overcomes some highlight and shadow reproduction limitations. MAXTONE screening software allows the operator to set a minimum dot size in order to prevent the formation of halftone dots that are too small for the flexographic medium. To extend the tonal range, MAXTONE screening software uses an FM-like screening technique in the highlights and shadows. To create lighter shades, dots are removed in a random pattern. By producing lighter colors with fewer (rather than smaller) halftone dots, improved highlight detail and a more robust flexographic printing plate are achieved. However, completely removing dots from a highlight will necessarily reduce the resolution and edge fidelity of the resulting printed images.

U.S. Pat. Nos. 5,892,588 and 6,445,465 (both Samworth) describe an apparatus and method for producing a halftone screen having a plurality of halftone dots arrayed along a desired screen frequency by deleting a number of halftone dots per unit area to obtain gray shades below a predetermined shade of gray.

There has been a desire in the industry for a way to prepare flexographic printing members without the use of photosensitive layers that are cured using UV or actinic radiation and that require liquid processing to remove non-imaged composition and mask layers. It has long been recognized that the simplest way of making a flexographic printing plate would be by direct engraving using laser beam ablation, thereby eliminating the need for complex post plate image processing such as multiple types of exposures, washing with solvents and long drying of the plate.

Direct laser engraving of precursors to produce relief printing plates and stamps is known, but the need for relief image depths greater than 500 μm creates a considerable challenge when imaging speed is also an important commercial requirement. In contrast to laser ablation of mask layers that require low to moderate energy lasers and fluence, direct engraving of a relief-forming layer requires much higher energy and fluence. A laser-engravable layer must also exhibit appropriate physical and chemical properties to achieve "clean" and rapid laser engraving (high sensitivity) so that the resulting printed images have excellent resolution and durability.

An additional problem arises in reproducing highlight dots when the relief pattern is formed by direct laser engraving, that is, the phenomenon of undercutting, or "natural" undercutting, where the top most surfaces of the smallest features are formed well below the top most surface of the flexographic printing plate due to details of the laser engraving process. This is distinct from "intentional" undercutting where laser intensity is used to purposefully reduce the level of the top most surface of a relief image feature. The terms "natural" or "naturally" imply unavoidable undercutting and is system dependent in that as the laser spot size, resolution, and the modulation rate of the engraving engine improves, the size of features "naturally" undercut will be smaller.

FIG. 1*a* shows a schematic cross section of a plate illustrative of the prior art that minimizes or prevents undercutting by limiting the smallest features to a size equal to or larger than the limit set by the spot size of the radiation and the writing engine used to form the laser engraved relief image. If this size limit is crossed, undercutting becomes unavoidable for a given relief forming system and is particularly a problem when the smallest features are less than the spot size of the radiation used to form the relief pattern. A related problem also arises in the fast scan direction of a 2D engraving engine (the main scanning direction) if the modulation frequency is too low. The leading and trailing edge of the beam exposure will only be on for a fraction of the engraving time of other regions. This will lead to a similar low exposure in unwanted regions and therefore to "natural" undercutting. When the undercut is too great, as illustrated in FIG. 1*b* the dots either print chaotically or not at all on press. Direct engraved printing members can typically suffer loss of highlights due to undercutting. A Feb. 1, 2010 publication by the Association of Japanese Flexo Printing Industry entitled "Direct Laser Plate Making Consideration for Current Status" describes the use of undercutting in preparing flexographic printing plates to release the printing pressure in the highlight areas. FIG. 7 in that publication shows a progressive undercutting in the relief image as the feature size is reduced. If undercutting is small, the relief in pressure on press may be desirable but when the undercutting is too great, the print quality suffers.

U.S. Patent Application Publication No. 2009/0223397 (Miyagawa et al.) describes an apparatus for forming a direct engraved convex dot on a flexographic printing plate using a light power of the light beam, which engraves all or part of an adjacent region which is adjacent to a convex portion which is to be left in a convex shape on a surface of the recording medium, is equal to or less than a threshold engraving energy, and at a region in the vicinity of an outer side of the adjacent region, the light power of the light beam is increased to a level higher than the light power used in the adjacent region. This may help alleviate the severity of undercutting by limiting the exposure at the top of the feature but will not eliminate the problem for the finest engraved features desirable.

Commonly-assigned U.S. Patent Publication No. 2012/0048133 (Burberry et al.) proposed addressing this problem by using a combination of AM, FM, and engagement modulation (EM) screening wherein a sub-area has dots each having a minimum receiver element contact area, and wherein a fraction of the dots has a topmost surface that is below the elastomeric topmost surface, but above the level that will transfer ink on press. This method can create a smoother tone scale but may be sensitive to variation of engagement for different press conditions.

In addition to these problems there are a number of inter-image effects that result from the proximity of highlight dots and other fine features that are "naturally" undercut to other image features such as solids, lines, and text. For example, in a field of highlight dots adjacent to a solid or a line or surrounded by lines, the row or rows of dots immediately proximate to the neighboring feature will lose density on the printed receiver or fail to print entirely resulting in undesirable non-uniformities.

Another inter-image effect can be observed when thin lines are proximate to solids, text or similar features. In that case a line intended to be straight will appear distorted near the neighboring feature. The line can appear curved, thicker or thinner.

Commonly-assigned copending U.S. patent application Ser. No. 13/011,103 describes a method of preparing a flexographic printing member that includes the steps of forming a relief image consisting of both fine-featured (undercut) regions and coarse-featured regions by means of direct laser engraving and an additional step of leveling the top most surface of all or part of the coarse-featured regions by means of laser engravings. The step of leveling the coarse-featured regions can occur before, during or after the formation of the fine-featured relief pattern. By this method undercutting can be effectively eliminated but other issues may limit its applicability. For example, uneven ablation of the topmost surfaces of the coarse features may impose unwanted patterns in uniform ink areas.

A separate top layer is often added either for smoothing or for other properties as taught in U.S. Publication No. 2011/0236705 (Melamed et al.). In this case the driving force to add the layer is for the specific printing surface properties, and as such, one chooses the most efficient material to meet the printing properties desired. The added layer, if too thick, will often impact the writing speed adversely.

Despite all of the progress made in flexographic printing to improve image quality in the highlight areas, there remains a need to improve the representation of small halftone dots and thin lines in printed flexographic images so that image detail is improved and dot gain is reduced.

SUMMARY OF THE INVENTION

Briefly, according to one aspect of the present invention a system for engraving flexographic relief members includes a laser scanning apparatus providing a focused radiation beam and a flexographic printing member precursor including a then top-most engraving control layer wherein the engraving control layer has a lower engraving sensitivity in the radiation beam than that of the underlying material The present invention provides an element for a flexographic printing member used to transfer ink from an image area to a receiver element, the flexographic printing member comprising elastomers and a relief image having an image area composed of a topmost surface, and a relief image floor. The relief image typically includes fine features susceptible to "natural" undercutting and coarse features that are not. "Natural" undercutting results from undesirable exposure at the tops of fine features during the laser ablation process due to the overlap of the laser spots spaced close to the feature or due to the partial exposure during modulation in the fast scan direction when high screen rulings are used. Amplitude modulation of the laser spots close to the fine features can be used to minimize the unwanted exposure but does not eliminate it. The exposure levels are much lower than those used to create the floor relief but nevertheless result in ablative erosion of the tops of the fine features (i.e. "natural" undercutting). The system of the present invention provides a thin top-most engraving control layer designed to have significantly lower ablation efficiency to laser radiation than the material composition below, such that low intensity levels on the fringes of the focused radiation beam, or due to a partial exposure leave the thin layer substantially intact while higher exposure levels at the center of the radiation beam at full exposure can remove it completely. This system provides less undercutting of the fine features while only marginally increasing the overall exposure needed to create the floor regions. The engraving control layer thickness is less than 10 microns and is preferably 1 to 10 microns thick and is most preferably only 5 or 10 microns thick. It can contain elastomers or other binder material, laser absorbing materials, organic or inorganic fillers and other addenda. It can contain voids, hollow beads or porous beads but in this case would typically have higher density (i.e. less voided volume) than the underlying composition rendering it more difficult to ablate.

Laser absorbing materials can be organic dyes or pigments, inorganic dyes or pigments or more typically carbon particles. In an ablation sensitive composition there is usually an optimum absorber concentration where too little results in poor ablation due to insufficient coupling of the laser radiation to heat and too much absorber limits ablation due to its bulk cohesive properties or by confining the heating to too thin a region at the surface. The bulk of the elastomeric printing element is typically formulated to have close to the optimum absorber concentration to maximize efficiency and through put. It may also be formulated to have a gradient absorber concentration designed to improve heating uniformity and ablation sensitivity.

In one embodiment of the invention the thin top-most engraving control layer contains less laser radiation absorber than the underlying layer reducing the amount of heat that can be coupled into the top layer at a given exposure. In another embodiment of the invention the thin top layer contains significantly more laser radiation absorber than is present in the underlying material reducing the effectiveness of laser ablation of the thin top layer and therefore the laser ablation sensitivity is lower. In another embodiment of the invention the thin top layer contains polymers that are less easily ablated than those used in the underlying composition. This can be achieved, for example, by having more extensively cross linked polymers in the top layer. In yet another embodiment of the invention the thin top layer contains more laser ablation insensitive filler materials than is present in the underlying material reducing the effectiveness of laser ablation of the thin top layer. Any combination of the above compositional differences can be used to control the engraving sensitivity of the thin top layer compared to the underlying composition provided that the top layer can be ablated when sufficient exposure is provided by the engraving system.

On press, the gap between the impression cylinder and a receiver element is adjusted to optimize print density and image quality. This gap is referred to as the engagement and creates the inking pressure (also known as "impression pressure") between the flexographic printing member and the receiver element to be printed. There is another gap controlled separately on press between the impression cylinder and the Anilox roller used to ink the member, also referred to as engagement. It is an aim of the current invention to reduce the offset of the topmost surface of features in the fine-featured regions and the topmost surface of the flexographic printing member such that the small features in the fine-featured region make sufficient contact with the Anilox roller to be properly inked and make sufficient contact to a receiver element to effectively and uniformly transfer of ink under the normal range of flexographic press conditions and engagement settings.

The invention and its objects and advantages will become more apparent in the detailed description of the preferred embodiment presented below.

DETAILED DESCRIPTION OF THE INVENTION

Definitions

Figure 1A:
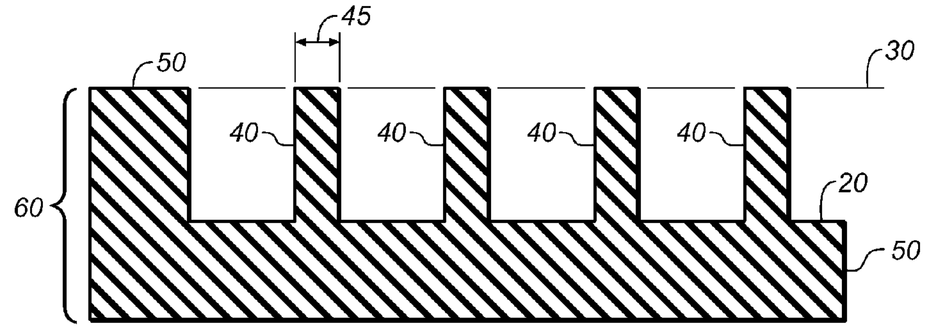
FIG. 1a (PRIOR ART)
FIG. 1*a* is a schematic cross-sectional diagram illustrating a prior art flexographic member or sleeve.

The following definitions identify various terms and phrases used in this disclosure to define the present invention. Unless otherwise noted, these definitions are meant to exclude other definitions of the terms or phrases that may be found in the prior art.

The term "flexographic printing precursor" refers to the material that is used to prepare the flexographic printing member of this invention and can be in the form of flexographic printing plate precursors, flexographic printing cylinder precursors, and flexographic printing sleeve precursors.

The term "flexographic printing member" refers to articles of the present invention that are imaged flexographic printing precursors and can be in the form of a printing plate having a substantially planar elastomeric topmost surface, or a printing cylinder or seamless printing sleeve having a curved elastomeric topmost surface. In the case of sleeves and cylinders heights and levels are, of course, in reference to the radial direction.

The term "receiver element" refers to any material or substrate that can be printed with ink using a flexographic printing member of this invention.

The term "ablative" relates to a composition or layer that can be imaged using a radiation source (such as a laser) that produces heat within the layer that causes rapid local changes in the composition or layer so that the imaged regions are physically detached from the rest of the composition or layer and ejected from the composition or layer.

"Ablation imaging" is also known as "ablation engraving," "laser engraving," or "direct engraving."

The term "laser ablation sensitivity" or "sensitivity" is defined as the amount of material removed per unit of laser exposure. In other words a more sensitive material will be engraved to a deeper level than a less sensitive material for a given exposure.

The term "fast scan" is defined as the direction of continuous scanning in a 2-D scanning system. For a drum scanner the fast scan is around the drum. For a flatbed scanner the fast scan is the direction of travel when writing a straight line in the direction of travel.

The "elastomeric topmost surface" refers to the outermost surface of the elastomeric composition or layer in which a relief image is formed and is the first surface that is struck by imaging radiation.

The term "relief image" refers to all of the topographical features of the flexographic printing member provided by imaging and designed to transfer a pattern of ink to a receiver element.

The term "image area" refers to a predetermined area of the relief image in the elastomeric composition, which predetermined area is designed to be inked and to provide a corresponding inked image area on a receiver element.

The term "relief image floor" refers to the bottom-most surface of the relief image. For example, the floor can be considered the maximum depth of the relief image from the elastomeric topmost surface and can typically range from 100 to 1000 μm. The relief image generally includes "valleys" that are not inked and that have a depth from the elastomeric topmost surface that is less than the maximum depth.

As used herein, the term "dot" refers to a formed protrusion or microstructure in the relief image formed in the flexographic printing member of this invention. Some publications refer to this dot as a "halftone dot." The term "dot" does not refer to the dot-like printed image on a receiver element that is provided by the dot on the flexographic printing member. However, it is desired that the dot surface area on the flexographic printing member would correspond as closely as possible to the dot-like image printed on a receiver element. Dots in the relief image smaller than a minimum dot size usually determined by specifics of the laser beam and print engine used to produce it are typically formed with top most surfaces that are below the original un-engraved surface of the member. This condition is referred to as undercutting or "natural" undercutting. A current estimate for the minimum dot size, given the best engraving systems currently available, would be approximately 30 μm by 30 μm or 900 $\mu m^2$ but smaller features that do not suffer from natural undercutting could become feasible as system resolution improves.

The term "fine feature" refers to any relief image feature intended to transfer ink to a receiver that is "naturally" undercut including such features as half-tone dots, stand-alone dots, fine lines, small point text or any other feature having its top most surface about 30 microns or more below the origin top most surface of the pre-engraved flexographic printing member due to the limitations of the engraving engine used to produce the relief image. A fine feature region is defined as any contiguous area of the engraved flexographic member containing only fine features.

The term "coarse feature" refers to any relief image feature intended to transfer ink to a receiver that can be formed with it top most surface within about 30 microns of the original top most surface of the pre-engraved flexographic printing member. A coarse feature region is defined as any contiguous area of the engraved flexographic member containing only coarse features. Thus all features intended to transfer ink to a receiver are either "coarse" or "fine" features and all of the image area of the flexographic printing member can be subdivide into "coarse" and "fine" regions.

The term "leveling" refers to the process of ablating the height of the top most surface of the coarse features to within a well controlled and predetermined distance to the top most surface of fine features by means of laser engraving.

Fine-featured relief is defined as any relief feature that is "naturally" undercut, including such features as half-tone dots, stand-alone dots, fine lines, small point text or any other feature. Naturally undercut means that the top most surface of the fine features is 30 microns or more below the origin top most surface of the pre-engraved flexographic printing member due to the limitations of the direct engraving engine used to produce the relief image. These are the features that cannot be formed with a given engraving engine without having their top most surface undercut 30 microns or more below the original surface of the flexographic printing member. With the current state of technology these fine-features typically have a shortest lateral linear dimension of about 30 microns or less. The current invention is intended to circumvent or ameliorate the deleterious effects that occur in flexographic printing on press due to natural undercutting. A fine-feature region is defined as any contiguous area of the engraved flexographic member containing only fine features. In contrast, coarse features are those having lateral linear dimensions large enough to ensure that the top most surface of the imaged feature can be left substantially undisturbed by the engraving process when no additional leveling procedure is employed. These features are commonly solids, mid range half-tone dots and shoulder half-tone dots, wide lines and larger point text typically having a shortest lateral linear dimension on the order of 30 microns or more. A coarse-feature region is defined as any contiguous area of the engraved flexographic member containing only coarse features.

Relief features are typically engraved into the flexographic printing member by scanning a single spot or multiple laser spots of intense, modulated and focused radiation over the surface of the member in the image area and collecting the ablated debris. The laser spots can be scanned over the image area of the member once or several times to control the depth of ablation. Each scan is commonly referred to as a pass. During each pass all, or part, of the image relief pattern can be addressed with predetermined laser intensity image-wise to affect the depth of ablation at every position in the final relief image.

Flexographic Printing Members

The flexographic printing members prepared using the present invention can be flexographic printing plates having any suitable shape, flexographic printing cylinders, or seamless sleeves that are slipped onto printing cylinders.

Elastomeric compositions used to prepare useful flexographic printing precursors are described in numerous publications including, but not limited to, U.S. Pat. No. 5,719,009 (Fan), U.S. Pat. No. 5,798,202 (Cushner et al.), U.S. Pat. No. 5,804,353 (Cushner et al.), and WO 2005/084959 (Figov), all of which are incorporated herein by reference with respect to their teaching of photosensitive materials and construction of flexographic printing precursors. In general, the elastomeric composition comprises a crosslinked elastomer or a vulcanized rubber.

DuPont's Cyrel® FAST™ thermal mass transfer plates are commercially available photosensitive resin flexographic printing plate precursors that comprise an integrated ablatable mask element and require minimal chemical processing. These elements can be used as flexographic printing precursors in the practice of this invention.

For example, flexographic printing precursors can include a self-supporting laser-ablatable or engravable, relief-forming layer (defined below) containing an elastomeric composition that forms a rubber or elastomeric layer. This layer does not need a separate substrate to have physical integrity and strength. In such embodiments, the laser-ablatable, relief-forming layer composed of the elastomeric composition is thick enough and laser ablation is controlled in such a manner that the relief image depth is less than the entire thickness, for example up to 80% of the entire thickness of the layer.

However, in other embodiments, the flexographic printing precursors include a suitable dimensionally stable, non-laser engravable substrate having an imaging side and a non-imaging side. The substrate has at least one laser engravable, relief-forming layer (formed of the elastomeric composition) disposed on the imaging side. Suitable substrates include but are not limited to, dimensionally stable polymeric films, aluminum sheets or cylinders, transparent foams, ceramics, fabrics, or laminates of polymeric films (from condensation or addition polymers) and metal sheets such as a laminate of a polyester and aluminum sheet or polyester/polyamide laminates, or a laminate of a polyester film and a compliant or adhesive support. Polyester, polycarbonate, vinyl polymer, and polystyrene films are typically used. Useful polyesters include but are not limited to poly(ethylene terephthalate) and poly(ethylene naphthalate). The substrates can have any suitable thickness, but generally they are at least 0.01 mm or more preferably from about 0.05 to about 0.3 mm thick, especially for the polymeric substrates. An adhesive layer may be used to secure the elastomeric composition to the substrate.

There may be a non-laser ablatable backcoat on the non-imaging side of the substrate (if present) that may be composed of a soft rubber or foam, or other compliant layer. This backcoat may be present to provide adhesion between the substrate and the printing press rollers and to provide extra compliance to the resulting printing member, or to reduce or control the curl of the printing member.

Thus, the flexographic printing precursor contains one or more layers. Besides the laser-engravable, relief-forming layer, there may be a non-laser ablatable elastomeric rubber layer (for example, a cushioning layer) between the substrate and the topmost elastomeric composition forming the laser-engravable relief-forming layer.

In general, the laser-engravable, relief-forming layer composed of the elastomeric composition has a thickness of at least 50 μm and preferably from about 50 to about 4,000 μm, or more preferably from 200 to 2,000 μm.

The elastomeric composition includes one or more laser-ablatable polymeric binders such as crosslinked elastomers or rubbery resins such as vulcanized rubbers. For example, the elastomeric composition can include one or more thermosetting or thermoplastic urethane resins that are derived from the reaction of a polyol (such as polymeric diol or triol) with a polyisocyanate, or the reaction of a polyamine with a polyisocyanate. In other embodiments, the elastomeric composition contains a thermoplastic elastomer and a thermally initiated reaction product of a multifunctional monomer or oligomer.

Other elastomeric resins include copolymers or styrene and butadiene, copolymers of isoprene and styrene, styrene-butadiene-styrene block copolymers, styrene-isoprene-styrene copolymers, other polybutadiene or polyisoprene elastomers, nitrile elastomers, polychloroprene, polyisobutylene and other butyl elastomers, any elastomers containing chlorosulfonated polyethylene, polysulfide, polyalkylene oxides, or polyphosphazenes, elastomeric polymers of (meth)acrylates, elastomeric polyesters, and other similar polymers known in the art.

Still other useful laser-engravable resins include vulcanized rubbers, such as EPDM (ethylene-propylene diene rubber), Nitrile (Buna-N), natural rubber, Neoprene or chloroprene rubber, silicone rubber, fluorocarbon rubber, fluorosilicone rubber, SBR (styrene-butadiene rubber), NBR (acrylonitrile-butadiene rubber), ethylene-propylene rubber, and butyl rubber.

Still other useful laser-engravable resins are polymeric materials that, upon heating to 300° C. (generally under nitrogen) at a rate of 10° C./minute, lose at least 60% (typically at least 90%) of their mass and form identifiable low molecular weight products that usually have a molecular weight of 200 or less. Specific examples of such laser engravable materials include but are not limited to, poly(cyanoacrylate)s that include recurring units derived from at least one alkyl-2-cyanoacrylate monomer and that forms such monomer as the predominant low molecular weight product during ablation. These polymers can be homopolymers of a single cyanoacrylate monomer or copolymers derived from one or more different cyanoacrylate monomers, and optionally other ethylenically unsaturated polymerizable monomers such as (meth) acrylate, (meth)acrylamides, vinyl ethers, butadienes, (meth) acrylic acid, vinyl pyridine, vinyl phosphonic acid, vinyl sulfonic acid, and styrene and styrene derivatives (such as α-methylstyrene), as long as the non-cyanoacrylate comonomers do not inhibit the ablation process. The monomers used to provide these polymers can be alkyl cyanoacrylates, alkoxy cyanoacrylates, and alkoxyalkyl cyanoacrylates. Representative examples of poly(cyanoacrylates) include but are not limited to poly(alkyl cyanoacrylates) and poly(alkoxyalkyl cyanoacrylates) such as poly(methyl-2-cyanoacrylate), poly (ethyl-2-cyanoacrylate), poly(methoxyethyl-2-cyanoacrylate), poly(ethoxyethyl-2-cyanoacylate), poly(methyl-2-cyanoacrylate-co-ethyl-2-cyanoacrylate), and other polymers described in U.S. Pat. No. 5,998,088 (Robello et al.)

In still other embodiments, the laser-engravable elastomeric composition can include an alkyl-substituted polycarbonate or polycarbonate block copolymer that forms a cyclic alkylene carbonate as the predominant low molecular weight product during depolymerization from engraving. The polycarbonate can be amorphous or crystalline, and can be obtained from a number of commercial sources including Aldrich Chemical Company (Milwaukee, Wis.). Representative polycarbonates are described for example in U.S. Pat. No. 5,156,938 (Foley et al.), columns 9-12 of which are incorporated herein by reference. These polymers can be obtained from various commercial sources or prepared using known synthetic methods.

In still other embodiments, the laser-engravable polymeric binder is a polycarbonate (tBOC type) that forms a diol and diene as the predominant low molecular weight products from depolymerization during laser-engraving.

The laser-engravable elastomeric composition generally comprises at least 10 weight % and up to 99 weight %, and typically from about 30 to about 80 weight %, of the laser-engravable elastomers or vulcanized rubbers.

In some embodiments, inert microcapsules are dispersed within laser-engravable polymeric binders. For example, microcapsules can be dispersed within polymers or polymeric binders, or within the crosslinked elastomers or rubbery resins. The "microcapsules" can also be known as "hollow beads," "microspheres," microbubbles," "microballoons," "porous beads," or "porous particles." Such components generally include a thermoplastic polymeric outer shell and either core of air or a volatile liquid such as isopentane and isobutane. These microcapsules can include a single center core or many interconnected or non-connected voids within the core. For example, microcapsules can be designed like those described in U.S. Pat. No. 4,060,032 (Evans) and 6,989,220 (Kanga), or as plastic micro-balloons as described for example in U.S. Pat. No. 6,090,529 (Gelbart) and U.S. Pat. No. 6,159,659 (Gelbart).

The laser-engravable, relief-forming layer composed of the elastomeric composition can also include one or more infrared radiation absorbing compounds that absorb IR radiation in the range of from about 750 to about 1400 nm or typically from 750 to 1250 nm, and transfer the exposing photons into thermal energy. Particularly useful infrared radiation absorbing compounds are responsive to exposure from IR lasers. Mixtures of the same or different type of infrared radiation absorbing compound can be used if desired. A wide range of infrared radiation absorbing compounds are useful in the present invention, including carbon blacks and other IR-absorbing organic or inorganic pigments (including squarylium, cyanine, merocyanine, indolizine, pyrylium, metal phthalocyanines, and metal dithiolene pigments), iron oxides and other metal oxides.

Additional useful IR radiation absorbing compounds include carbon blacks that are surface-functionalized with solubilizing groups are well known in the art. Carbon blacks that are grafted to hydrophilic, nonionic polymers, such as FX-GE-003 (manufactured by Nippon Shokubai), or which are surface-functionalized with anionic groups, such as CAB-O-JET® 200 or CAB-O -JET® 300 (manufactured by the Cabot Corporation) are also useful. Other useful pigments include, but are not limited to, Heliogen Green, Nigrosine Base, iron (III) oxides, transparent iron oxides, magnetic pigments, manganese oxide, Prussian Blue, and Paris Blue. Other useful IR radiation absorbing compounds are carbon nanotubes, such as single- and multi-walled carbon nanotubes, graphite, graphene, and porous graphite.

Other useful infrared radiation absorbing compounds (such as IR dyes) are described in U.S. Pat. No. 4,912,083 (Chapman et al.), U.S. Pat. No. 4,942,141 (DeBoer et al.), U.S. Pat. No. 4,948,776 (Evans et al.), U.S. Pat. No. 4,948,777 (Evans et al.), 4,948,778 (DeBoer), U.S. Pat. No. 4,950,639 (DeBoer et al.), U.S. Pat. No. 4,950,640 (Evans et al.), U.S. Pat. No. 4,952,552 (Chapman et al.), U.S. Pat. No. 4,973,572 (DeBoer), U.S. Pat. No. 5,036,040 (Chapman et al.), and 5,166,024 (Bugner et al.).

Optional addenda in the laser-engravable elastomeric composition can include but are not limited to, plasticizers, dyes, fillers, antioxidants, antiozonants, stabilizers, dispersing aids, surfactants, dyes or colorants for color control, and adhesion promoters, as long as they do not significantly interfere with engraving efficiency.

The flexographic printing precursor can be formed from a formulation comprising a coating solvent, one or more elastomeric resins, and an infrared radiation absorbing compound, to provide an elastomeric composition. This formulation can be formed as a self-supporting layer or applied to a suitable substrate. Such layers can be formed in any suitable fashion, for example by injecting, spraying, or pouring a series of formulations to the substrate. Alternatively, the formulations can be press-molded, injection-molded, melt extruded, co-extruded, or melt calendared into an appropriate layer or ring (sleeve) and optionally adhered or laminated to a substrate and cured to form a layer, flat or curved sheet, or seamless printing sleeve. The flexographic printing precursors in sheet-form can be wrapped around a printing cylinder and fused at the edges to form a seamless printing precursor.

Method of Forming Flexographic Printing Member

Ablation or engraving energy can be applied using a suitable laser such as a $CO_2$, infrared radiation-emitting diode, or YAG lasers, or an array of such lasers. Ablation engraving is used to provide a relief image with a minimum floor depth of at least 100 μm or typically from 300 to 1000 μm. However, local minimum depths between halftone dots can be less. The relief image may have a maximum depth up to about 100% of the original thickness of the laser-engravable, relief-forming layer when a substrate is present. In such instances, the floor of the relief image can be the substrate if the laser-engravable, relief-forming layer is completely removed in the image area, a lower region of the laser-engravable, relief-forming layer, or an underlayer such as an adhesive layer, compliant layer, or a non-ablative elastomeric or rubber underlayer. When a substrate is absent, the relief image can have a maximum depth of up to 80% of the original thickness of the laser-engravable, relief-forming layer comprising the elastomeric composition. A laser operating at a wavelength of from about 700 nm to about 11 μm is generally used, and a laser operating at from 800 nm to 1250 nm is more preferable. The laser must have a high enough intensity that the pulse or the effective pulse caused by relative movement is deposited approximately adiabatically during the pulse.

Generally, engraving is achieved using at least one infrared radiation laser having a minimum fluence level of at least 1 $J/cm^2$ at the elastomeric topmost surface and typically infrared imaging is at from about 20 to about 1000 $J/cm^2$ or more preferably from about 50 to about 800 $J/cm^2$.

Engraving a relief image can occur in various contexts. For example, sheet-like precursors can be imaged and used as desired, or wrapped around a printing cylinder or cylinder form before imaging. The flexographic printing precursor can also be a printing sleeve that can be imaged before or after mounting on a printing cylinder.

During imaging, most of the removed products of engraving are gaseous or volatile and readily collected by vacuum for disposal or chemical treatment. Any solid debris can be similarly collected using vacuum or washing.

After imaging, the resulting flexographic printing member can be subjected to an optional detacking step if the elastomeric topmost surface is still tacky, using methods known in the art.

During printing, the resulting flexographic printing member is inked using known methods and the ink is appropriately transferred to a suitable receiver element.

After printing, the flexographic printing member can be cleaned and reused. The printing cylinder can be scraped or otherwise cleaned and reused as needed.

FIG. 1*a* shows a prior art flexographic member 60, for example, plate or sleeve, having an original top most surface 30 and floor level 20 with an engraved relief pattern having coarse features 50, and smaller (but not "fine" features) highlight features 40. The small coarse features are limited to no less than a minimum lateral dimension 45 to prevent significant "natural" undercutting. The side walls of features in this and subsequent diagrams are represented as vertical but it is understood that the side walls of the actual relief image can be sloped or curved or can have plateaus below the top most surface of the feature or any combination of these patterns.

Figure 1B:
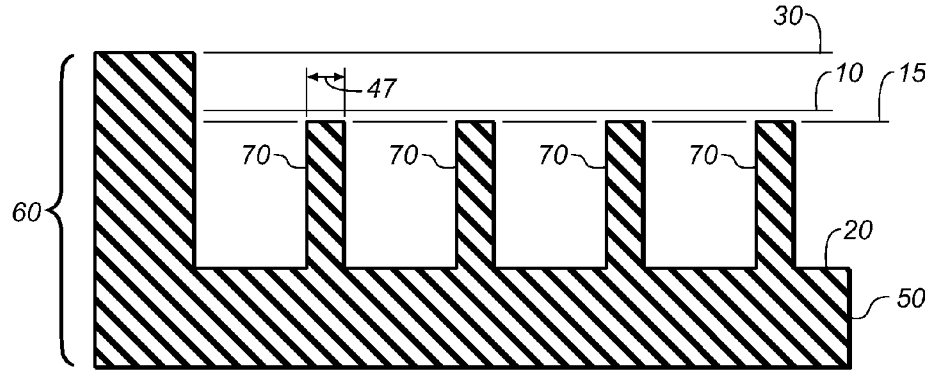
FIG. 1b (PRIOR ART)
FIG. 1*b* is a schematic cross-sectional diagram illustrating prior art having coarse features and fine features.

FIG. 1*b* is a schematic cross-sectional diagram illustrating prior art having coarse features 50, and fine features 70. The fine features have lateral dimensions 47 that are small compared to size of the spot used to laser engrave the relief pattern and are therefore "naturally" undercut to a level 15 below a critical level 10 that results in features that print chaotically or not at all on press.

Figure 2:
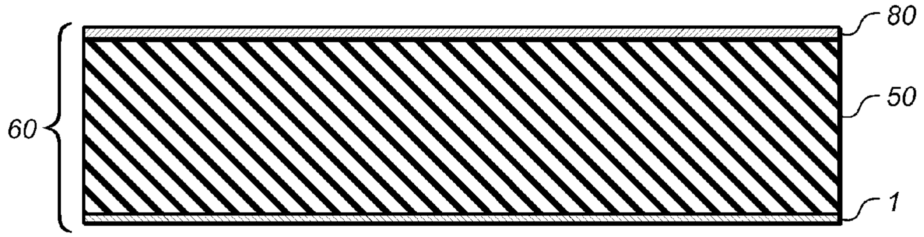
FIG. 2 is schematic cross-sectional diagram of an embodiment of the current invention showing low sensitivity top surface and the underlying elastomeric printing member.

The current invention can be understood with reference to a cross-sectional diagram of the current invention in FIG. 2 showing the pre-engraved flexographic member 60, a thin top most engraving control layer 80 having lower laser ablation sensitivity than the underlying composition 50 and an optional backing layer 1.

Figure 3A:
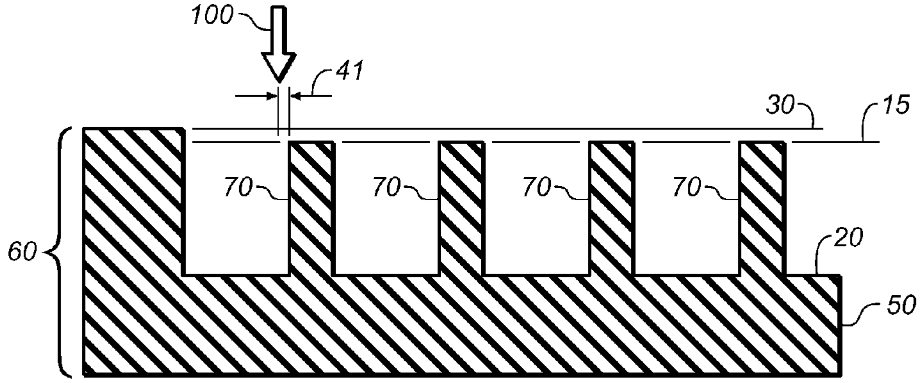
FIG. 3a (PRIOR ART)
FIG. 3*a* is schematic cross-sectional diagram of the prior art showing laser radiation engraving fine features with undesirable exposure at the top.

FIG. 3*a* is schematic cross-sectional diagram of the prior art showing laser radiation 100 spaced one pixel distance 41 from the edge of a fine feature 70 that causes undesirable exposure at the tops of fine features resulting in undercutting 15 from the topmost surface 30 of the flexographic printing member 60 having an elastomeric composition 50.

Figure 3B:
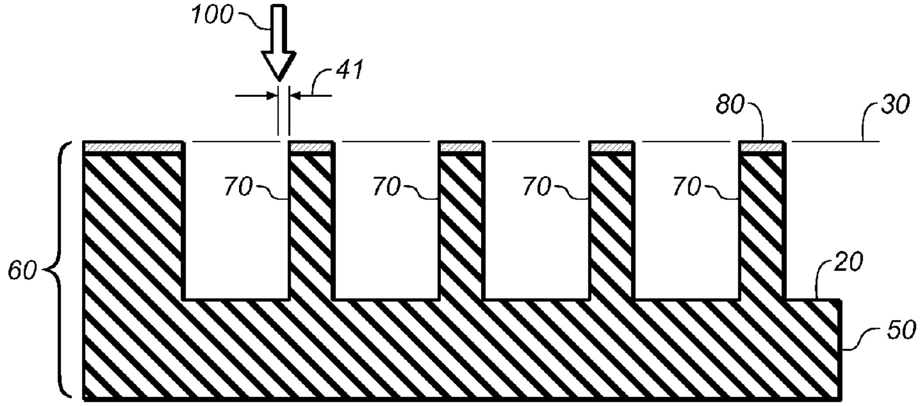
FIG. 3*b* is schematic cross-sectional diagram of the current invention showing laser radiation engraving fine features with undesirable exposure at the top.

FIG. 3*b* is schematic cross-sectional diagram of the current invention showing laser radiation 100 spaced one pixel distance 41 from the edge of a fine feature 70 that causes undesirable exposure at the tops of the features of the flexographic printing member 60 and a thin top most layer 80 having lower sensitivity to laser ablation than the underlying composition 50.

Figure 4:
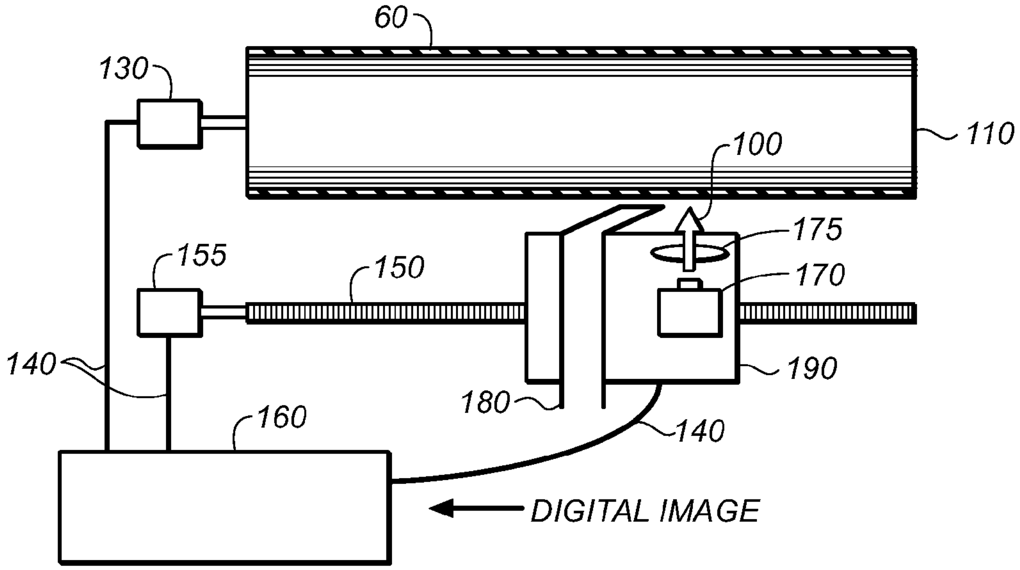
FIG. 4 is a schematic diagram of a laser engraving apparatus used to implement the current invention.

FIG. 4 shows an apparatus for preparing a flexographic printing plate according to the present invention. A flexographic printing member 60 is mounted on a drum 110 which is turned by motor 130. A lead screw 150 is driven by a lead screw motor 155. A printhead platform 190 is attached to lead screw 150 which moves the platform parallel to a surface of the drum. A laser thermal printhead 170 is mounted on the platform for imaging the flexographic printing member. A lens 175 directs laser radiation 100 to the flexographic printing member. Electrical leads 140 connect various pieces of the apparatus with a computer 160 coordinating movement of the drum 110, lead screw 150, and operation of the laser thermal printhead 170. A debris collection system 180 collects detritus generated by laser thermal engraving. A relief image with coarse and fine features is created as described above.

Experimental

A commercially available direct engravable flexographic printing member (1.14 mm from Böttcher) was used as a control example of the prior art. A 4 inch×6 inch piece was cut and mounted on a lathe engraving apparatus similar to the one schematically represented in FIG. 4. A single fiber coupled diode laser having a maximum power of approximately 10 W at 910 nm was focused onto the surface of the printing member. The effective spot size on the media was approximately 50 μm. Drum speed and laser power were adjustable under computer control as was the step size between successive turns of the drum in the slow scan (i.e. perpendicular to the drum turning) direction. In this way a series of patches having various laser line spacing and exposure levels were engraved as indicated in Tables 1 and 2. The undercut depths was determined from the difference between the unexposed surface surrounding the patches and the average level midway between laser scans in the patches as a function of line spacing at an exposure of 78 $J/cm^{-2}$ and are reported for the control and the invention example described below in Table 1. The improvement factor for each line spacing was given by the ratio of the control undercut depth to invention undercut depth.

The relief depth from scans having nearly complete overlap (10 μm spacing) was used to determine laser sensitivity, S, where $$S = \text{Relief}(\mu m)/\text{Exposure}(Jcm^{-2}),$$

Relief was the difference between the unexposed surface surrounding the patches and the average depth in the patch and exposure was determined from the laser fluence and drum speed in the usual way. A comparison of the prior art control and the invention example described below is given in Table 2.

An example of the precursor useful in the current invention was prepared as follows. A 4 inch×6 inch piece of 1.14 mm Bottcher plate was spin coated with a formula prepared from Mogul L carbon black and Kraton D1102 dissolved in toluene. Chromed grinding media was added to the dispersion formulation roller milled at 100 revolutions per minute over night to disperse carbon before the dispersion was spin coated at 1500 rpm on the Böttcher control media and dried in a convection oven at 80 C for 2 hours. This resulted in a thin layer approximately 6 μm thick on top of the original flexographic printing member. The plate was mounted on the lathe engraving apparatus, exposed and measured according to the same procedures described above and the result report in Tables 1 and 2 for comparison.

TABLE 1

A comparison of undercut depth (μm) vs. line spacing (exposure; 78 $J/cm^{-2}$). The invention improvement factor (Comparison relief/Invention relief) is also shown.

| | Line Spacing (μm) | | | | |
|---|---|---|---|---|---|
| ID | 20 | 30 | 40 | 50 | 60 |
| Control | 41 | 28 | 17 | 10 | 0 |
| Invention | 28 | 13 | 11 | 5 | 0 |
| Factor | 1.5 | 2.2 | 1.5 | 2.0 | — |

TABLE 2

Relief depth (μm) vs. Exposure

| Exposure ($J/cm^2$) | comparison (μm) | Invention (μm) |
|---|---|---|
| 0 | 0 | 0 |
| 5 | 10 | 0 |
| 11 | 17 | 0 |
| 16 | 29 | 20 |
| 23 | 35 | 32 |
| 29 | 38 | 25 |
| 30 | 47 | 31 |
| 35 | 50 | 43 |
| 41 | 51 | 35 |
| 45 | 60 | 42 |
| 54 | 73 | 66 |
| 68 | 86 | 73 |
| 105 | 124 | 110 |
| 150 | 155 | 153 |

The sensitivity data for each sample was approximately linear and parallel to each other. The threshold sensitivity of the invention (i.e. the point where the line intercepts the exposure axis) was offset from the control by about 11 $Jcm^{-2}$. This offset is a direct consequence of the fact that the thin top-most engraving control layer had lower laser ablation sensitivity than the underlying elastomeric material. The sensitivity curves are parallel because addition expose is equally effective at removing material once the top layer is ablated. A typical floor relief required for clean prints on press is on the order of 450 μm or more. A linear extrapolation of exposure needed to ablate 450 μm indicates that the prior art control would required 383 $J/cm^2$ while the invention example required 390 $J/cm^2$, 7 $J/cm^2$ more, corresponding to only a 2% decrease in throughput. Another estimate of throughput based on the 11 $J/cm^2$ threshold offset and assuming ideal parallel sensitivity suggests no more than a 3% decrease in throughput, small in either case. The results in Table 1 on the other hand show a significant reduction in undercutting, exhibiting up to a factor of 2 or more improvement for line spacing between 30 μm to 50 μm. Thus, for no more than a 3% reduction in sensitivity, undercutting was reduced by 55%. In many applications this image quality improvement is well worth the minor tradeoff in throughput.

Sensitivity Comparison

An addition trial was run to demonstrate that the sensitivities of the material in the thin top layer was in fact less than the that of the underlying bulk layer used in the example above. The dispersion used in the example above to spin coat the thin layer on the Böttcher substrate was instead cast as the free-standing thick layer in a Teflon™ dish and allowed to dry for three days in a hood under constant air flow and room temperature. The dried film was removed from the substrate and exposed using the lathe engraving apparatus as described above. A second Böttcher control sample was also exposed in the same manner and the results are given in Table 3.

TABLE 3

Comparison of Relief depth (μm) vs. Exposure for top layer material and bulk layer material

| Exposure ($J/cm^2$) | Top Layer alone Depth (μm) | Böttcher alone Depth (μm) |
|---|---|---|
| 77.5 | 38.5 | 86.6 |
| 54.3 | 22 | 70 |
| 34.9 | 5 | 49 |
| 23.3 | 1 | 30 |
| 15.5 | 0 | 28 |

The results in Table 3 clearly show that the material used as a thin top control layer was less sensitive to the laser radiation than the underlying bulk material confirming the assertion above.

The invention has been described in detail with particular reference to certain preferred embodiments thereof, but it will be understood that variations and modifications can be effected within the scope of the invention.

PARTS LIST

1 backing layer
10 critical level
15 top most surface level of fine features
16 high frequency engraving depth
17 separation between high frequency engraving peaks
18 top most surface level of coarse features after laser leveling
20 level of the floor
30 top most surface level of the flexographic member
40 highlight features
41 one pixel distance
45 minimum lateral dimension of coarse features
47 lateral dimension of fine features
50 coarse features
60 flexographic member
70 fine features
80 control layer
100 laser radiation
110 drum
130 drum motor
140 electrical leads
150 lead screw
155 lead screw motor
160 computer
170 laser thermal printhead
175 laser lens
180 debris collection
190 printhead platform

The invention claimed is:

1. A system for engraving a flexographic relief member comprising:

a laser scanning apparatus providing a focused laser beam;

wherein the flexographic relief member comprises:

a laser engraveable flexographic member;

a thin engraveable control layer on top of the flexographic member wherein the engraveable control layer has a thickness of 1-10 microns;

wherein the engraveable control layer has an engraving sensitivity lower than the flexographic member; and wherein the focused laser beam ablates both the control layer and the engraveable flexographic member.

2. The system of claim 1 wherein the control layer has less laser radiation absorber than the flexographic member.

3. The system of claim 1 wherein the control layer has more the filler than the flexographic member.

4. The system of claim 1 wherein sensitivity of the control layer to radiation is less than the sensitivity of the flexographic member.

5. The system of claim 1 wherein sensitivity of the control layer to radiation is at least three times less sensitive than the flexographic member.

6. The system of claim 1 wherein the control layer requires at least three times the exposure of the flexographic member for engraving a 10 micron depth.

7. The system of claim 1 wherein a continuous wave (CW) laser provides said radiation beam.

* * * * *